United States Patent
Goldstein et al.

(10) Patent No.: US 10,185,557 B2
(45) Date of Patent: Jan. 22, 2019

(54) ENHANCED METADATA TRACKING IN A CHANGE MANAGEMENT SYSTEM

(71) Applicant: CA, Inc., New York, NY (US)

(72) Inventors: Edward Alan Goldstein, Walpole, MA (US); Arthur Vincent Richards, Natick, MA (US)

(73) Assignee: CA, Inc., New York, NY (US)

( * ) Notice: Subject to any disclaimer, the term of this patent is extended or adjusted under 35 U.S.C. 154(b) by 365 days.

(21) Appl. No.: 14/926,091

(22) Filed: Oct. 29, 2015

(65) Prior Publication Data
US 2017/0123932 A1 May 4, 2017

(51) Int. Cl.
*G06F 17/30* (2006.01)
*G06F 8/71* (2018.01)

(52) U.S. Cl.
CPC .................................. *G06F 8/71* (2013.01)

(58) Field of Classification Search
CPC .................................................. G06F 11/1469
USPC ......................................................... 707/695
See application file for complete search history.

(56) References Cited

U.S. PATENT DOCUMENTS

| 8,095,575 | B1* | 1/2012 | Sharma | G06F 17/211 707/811 |
| 2007/0214334 | A1* | 9/2007 | Maruyama | G06F 11/1469 711/165 |
| 2008/0307255 | A1* | 12/2008 | Chen | G06F 11/1471 714/13 |
| 2009/0138808 | A1* | 5/2009 | Moromisato | G06Q 10/10 715/758 |
| 2011/0191299 | A1* | 8/2011 | Huynh Huu | G06F 17/30 707/646 |
| 2017/0315997 | A1* | 11/2017 | Lee | G06F 17/30371 |
| 2017/0371855 | A1* | 12/2017 | Haines | G06F 17/243 |

* cited by examiner

*Primary Examiner* — Baoquoc N To
(74) *Attorney, Agent, or Firm* — Meyertons, Hood, Kivlin, Kowert & Goetzel, P.C.

(57) ABSTRACT

A change management system generates change records corresponding to changes to tracked documents, and stores a master control file comprising metadata records that respectively correspond to the tracked documents and which comprise a tracked metadata field and a time field. Responsive to detecting that a change to a given document is of a predefined type, the tracked metadata field in the corresponding metadata record is modified, and the time field in that metadata record is updated accordingly. In response to a problem event, it is determined that the problem event relates to the given document, and, based on the time field, a subset of the change records is selected. Each change record in the subset corresponds to the given document. A problem change record is identified from the change records in the subset, and used to revert the given document to a state previous to the problem event.

20 Claims, 7 Drawing Sheets

| DOCUMENT VERSION | TRACKED METADATA FIELD | FIRST MODIFIED | LAST MODIFIED | USER ID | MODIFICATIONS |
|---|---|---|---|---|---|
| 1 | A | - | - | - | 0 |
| 2 | AB | 1/1/2016 05:00 | 1/1/2016 05:00 | ADAM | 1 |
| 3 | ABC | 1/1/2016 05:00 | 1/2/2016 07:00 | BOB | 2 |
| 4 | NONSENSE | 1/1/2016 05:00 | 1/5/2016 09:00 | CHARLIE | 3 |
| 5 | NONSENSE | 1/1/2016 05:00 | 1/5/2016 09:00 | CHARLIE | 3 |
| 3 | ABC | 1/1/2016 05:00 | 1/2/2016 07:00 | BOB | 2 |

FIG. 3

ENHANCED METADATA TRACKING IN A CHANGE MANAGEMENT SYSTEM

BACKGROUND

Change management systems are commonly used to keep track of changes made to documents by one or more users. Such systems may record the changes that are made to a document so that specific versions of the document may be recalled later. For example, if a source code document tracked by a change management system is modified in a manner that introduces software bugs, the change management system may be used to revert the source code document to a state previous to when the software bugs were introduced.

One way that change management systems may track documents and record changes is by generating change records that record differences between an earlier and a later version of a document. This change document may then be applied to the later version in order to recreate the earlier version. If several changes are made to the document, resulting in several versions, multiple change records may be generated. To revert back to the earliest version of a tracked document, according to some change management systems, each of the many change records that may have been generated for that document must be applied, as each change record only records the differences between a particular document version and the version immediately previous thereto.

Deployed broadly, e.g., in support of an entire business or massive software project involving thousands of tracked documents, a massive number of change records may result. When a problem arises that requires rolling back documents, it may not be clear what change (or changes) to the tracked documents was responsible for the problem. With so many documents and associated change records, identifying the appropriate change record(s) to apply in order to alleviate the problem is often onerous and time-consuming.

BRIEF SUMMARY

Various embodiments of the present disclosure include methods, apparatus, computer program products embodiment on computer-readable storage mediums, and systems of enhanced metadata tracking in a change management system. In an embodiment, a method, implemented in a computing device, comprises generating change records corresponding to changes to documents tracked by a change management system, and storing a master control file comprising one or more metadata records. Each metadata record respectively corresponds to one of the tracked documents and comprises a tracked metadata field and a time field. Responsive to detecting that a change to a given document within the tracked documents is of a predefined type, the method modifies the tracked metadata field in the metadata record that corresponds to the given document, and updates the time field in the metadata record that corresponds to the given document with a time that corresponds to the modifying of the tracked metadata field. In response to a problem event, the method determines that the problem event relates to the given document, and selects, based on the time field in the metadata record that corresponds to the given document, a subset of the change records. Each change record in the subset corresponds to the given document. The method then identifies a problem change record from the change records in the subset, and uses the problem change record to revert the given document to a state previous to the problem event.

In another embodiment, a change management system comprises non-transitory storage and processing circuitry communicatively coupled to the non-transitory storage. The non-transitory storage is configured to store data. The processing circuitry is configured to generate change records corresponding to changes to documents tracked by a change management system, and store, in the non-transitory storage, a master control file comprising one or more metadata records. Each metadata record respectively corresponds to one of the tracked documents and comprises a tracked metadata field and a time field. Responsive to detecting that a change to a given document within the tracked documents is of a predefined type, the processing circuitry is further configured to modify the tracked metadata field in the metadata record that corresponds to the given document, and update the time field in the metadata record that corresponds to the given document with a time that corresponds to the modifying of the tracked metadata field. In response to a problem event, the processing circuitry is further configured to determine that the problem event relates to the given document, and select, based on the time field in the metadata record that corresponds to the given document, a subset of the change records. Each change record in the subset corresponds to the given document. The processing circuitry is further configured to identify a problem change record from the change records in the subset, and use the problem change record to revert the given document to a state previous to the problem event.

In a further embodiment, a non-transitory computer readable medium stores a computer program product for controlling a programmable change management system, the computer program product comprising software instructions that, when executed by processing circuitry of the programmable change management system, cause the programmable change management system to generate change records corresponding to changes to documents tracked by a change management system, and store a master control file comprising one or more metadata records. Each metadata record respectively corresponds to one of the tracked documents and comprises a tracked metadata field and a time field. Responsive to detecting that a change to a given document within the tracked documents is of a predefined type, the software instructions further cause the programmable change management system to modify the tracked metadata field in the metadata record that corresponds to the given document, and update the time field in the metadata record that corresponds to the given document with a time that corresponds to the modifying of the tracked metadata field. In response to a problem event, the software instructions further cause the programmable change management system to determine that the problem event relates to the given document, and select, based on the time field in the metadata record that corresponds to the given document, a subset of the change records. Each change record in the subset corresponding to the given document. The software instructions further cause the programmable change management system to identify a problem change record from the change records in the subset, and use the problem change record to revert the given document to a state previous to the problem event.

The embodiments of the present disclosure are not limited to the above contexts or examples, but may include other features and advantages, such as those described in the following detailed description.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of document(s) 210, generally, as opposed to discussion of particular instances of a document 210a, 210b).

FIG. 3 is a table illustrating an example of fields in a metadata record that are modified responsive to changes made to a document tracked by a change management system according to one or more embodiments of the present disclosure.

DETAILED DESCRIPTION

Figure 1:
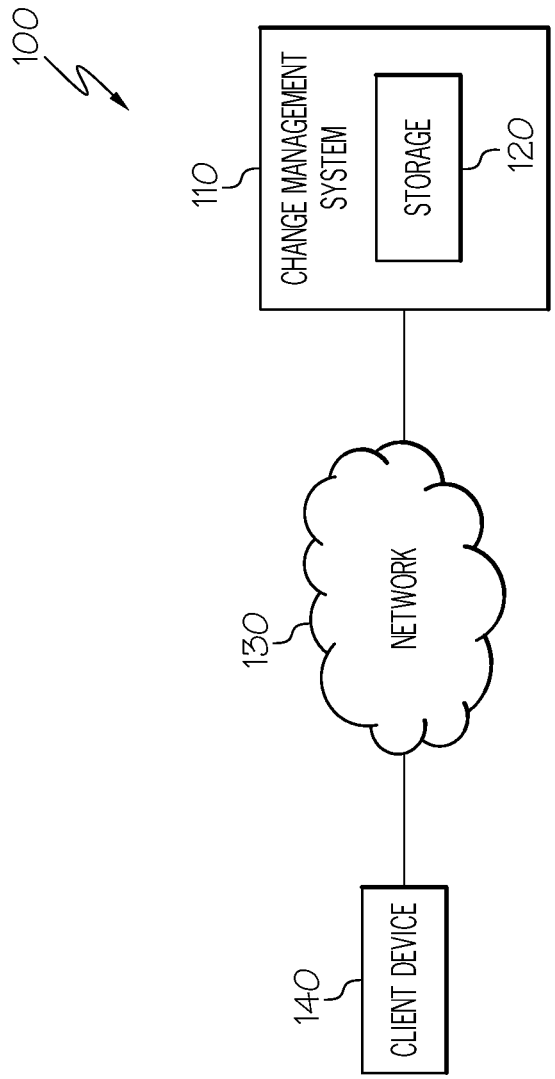
FIG. 1 is a block diagram illustrating an exemplary computing environment supporting a change management system according to one or more embodiments of the present disclosure.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure generally relate to a change management system that generates change records in response to changes made to tracked documents. FIG. 1 illustrates an exemplary general computing environment 100 in which such a change management system 110 may operate. This computing environment 100 includes the change management system 110, a client device 140, and a network 130.

The client device 140 may be any computing device capable of exchanging signals with the network 130 in order to communicate with the change management system 110. Examples of the client device 140 include a personal computer, a laptop computer, a desktop computer, a workstation, a smartphone, a tablet computer, a wearable computer, a server, a server cluster, and a smart appliance.

The network 130 may be any network capable of carrying communication signals between the client device 140 and the change management system 110. Examples of the network 130 include (but are not limited to) one or more of the Internet, one or more local area networks, one or more wireless networks, one or more cellular networks, one or more Internet Protocol-based networks, one or more Ethernet networks, one or more optical networks, and one or more circuit switched networks.

The change management system 110 may be any computing system comprising non-transitory storage 140, whether centralized or distributed. For example, the change management system 110 may be a network server that comprises one or more solid state drives. Alternatively, the change management system 110 may be a compute blade server connected via the network 130 to a storage area network (SAN) comprising one or more disk arrays. Further examples of the physical structure of the change management system 110 will be discussed in more detail below.

Figure 2:
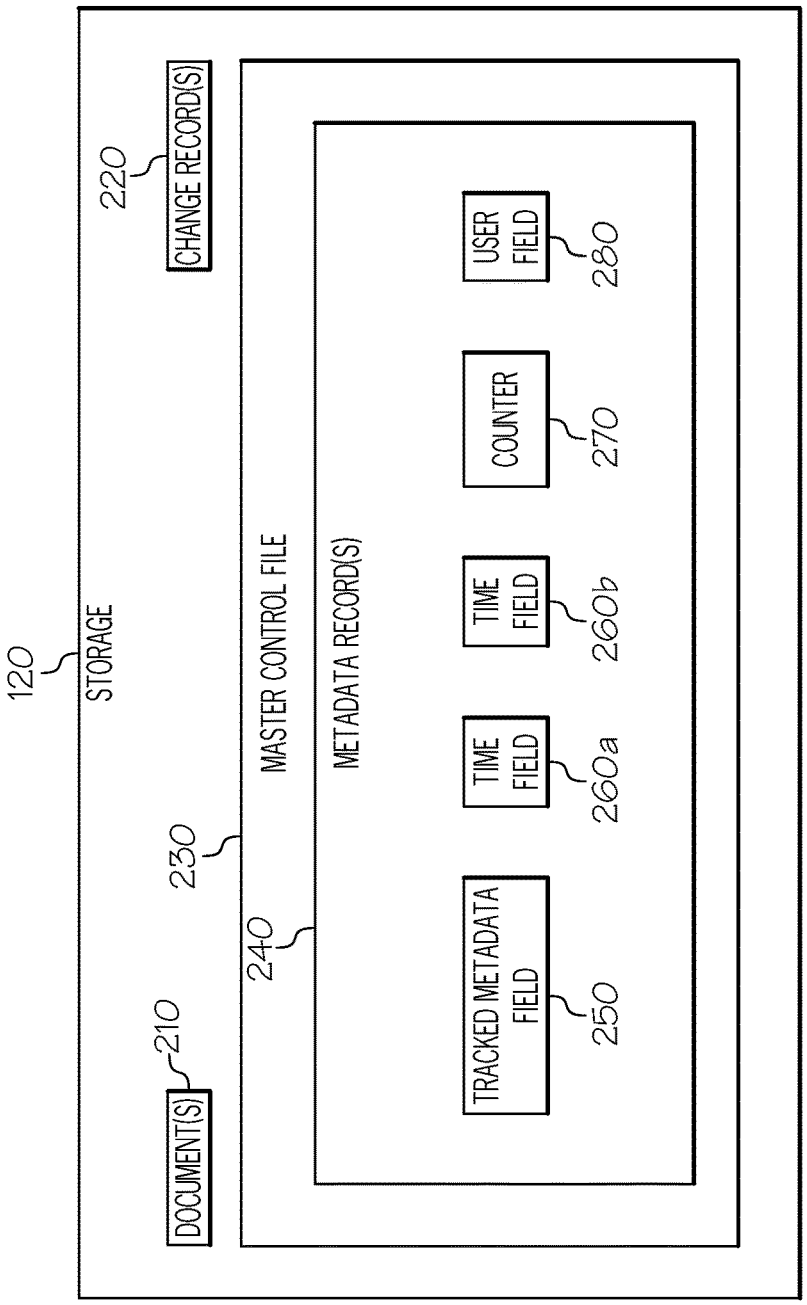
FIG. 2 is a block diagram illustrating exemplary storage of a change management system according to one or more embodiments of the present disclosure.

The storage 140 of the change management system 110 may comprise various data useful for performing any of a variety of potential change management tasks. A logical block diagram illustrating an example of the storage 140 is illustrated in FIG. 2. As exemplified in FIG. 2, the storage 140 comprises one or more electronic documents 210 tracked by the change management system 110, one or more change records 220, and a master control file 230 that is distinct from the documents 210 and change records 220.

The documents 210 may be of one or more types. For example, the documents 210 may include one or more source code documents, emails, images, media files, electronic slide presentations, text files, webpages, notes, word processing documents, and any combination thereof. The documents 210 may be changed by any of a number of a variety of supported mechanisms. For example, a document 210 may be accessed remotely by the client device 140, edited, and saved. For another example, a document 210 may be changed by a local user of the change management system 110. For a further example, a document 210 may be changed by an automated process running on the change management system 110, or on the client device 140.

The change records 220 are generated by the change management system 110 and correspond to changes made to the documents 210. For example, each time the change management system 110 detects a change from a previous version of a document 210 to a subsequent version of the document 210, the change management system 110 may generate a change record 220 that records the differences between the two versions. Accordingly, each change record 220 may be specifically associated with a particular document 210. Further, a document 210 may be associated with zero, one, or a plurality of change records 220, depending (for example) on how many times that document 210 has been modified. Thus, a document 210 that has been modified several times may be associated with several change records 220, whereas a document 210 that has never been modified may not be associated with any change records 220.

The change records 220 may be used to revert the corresponding document 210 back to an earlier state. For example, the change management system 110 may revert a fourth version of a document 210 back to the first version of that document 210 by applying, to the fourth version of the document 210: a change record 220 that records the differences between the fourth and third versions; then applying a change record 220 that records the differences between the third and second versions; and finally, applying a change record 220 that records the differences between the second and first versions of the document 210.

Such a change management system 110 may support a large number of users and documents 210. Over time and as changes to documents 210 accrue, a massive number of change records 220 may result. To facilitate management of a potentially vast number of documents 210 and change records 220, the change management system 110 may make use of a master control file 230 that tracks critical metadata concerning the documents 210 and/or change records 220 in the storage 140. By using the master control file 230 in this way, information important to the responsibilities of the change management system 110 may be kept readily available for use by the change management system 110.

As shown in the example of FIG. 2, the master control file 230 comprises one or more metadata records 240. Each metadata record 240 respectively corresponds to one of the tracked documents 210, and may store information about that document 210. In particular, each metadata record 240 at least comprises a tracked metadata field 250 and a time field 260a, though it may also comprise an additional time field 260b, a counter 270, a user field 280, and other fields (not shown) as may be required by the change management system 110.

The change management system 110 may update one or more fields of the metadata record 240 when a change of a predefined type is made to the corresponding document 210. In particular, the tracked metadata field 250 may be updated in response to such a change. The tracked metadata field 250 represents a field with information about the corresponding document 210 that is significant enough to be tracked by the corresponding time field 260a. Thus, when a particular type of change to the document 210 associated with the metadata record 240 causes the tracked metadata field 250 to be modified, the time field 260a is updated in response. As discussed above, a change record 220 may also be associated with this change. Thus, as will be discussed in greater detail below, embodiments of the present disclosure make use of the time field 260a in order to locate change records 220 that are relevant to the particular type (or types) of changes that caused the tracked metadata field 250 to be updated.

For example, it may be critical to a particular business that users are able to open, modify, and save the documents 210 in the change management system 110 using word processing software that supports particular file formats, such as the .doc and .docx formats. Accordingly, the change management system 110 may update the tracked metadata field 250 whenever a user changes the file format of the corresponding document 210. Because (in this example) the metadata field associated with file formats is a tracked metadata field 250 (as described above), the modification to the tracked metadata field causes the time field 260a to be updated with the time of the tracked metadata field 250 modification. In this way, if a user introduces a problem event by saving the document 210 into a file format that is not supported by the word processing software (e.g., PDF), the problem change record 220 (i.e., the change record recording the change in file format from .doc to .pdf) will be easier to locate among the potentially vast number of change records 220 in storage 140 because the time field 260a is an indicator of the last time that the document's 210 file format was changed. Accordingly, change records 220 generated subsequent to the time in the time field 260a need not be considered when trying to locate the problem change record 220 associated with this specific problem event. Once this problem change record 220 is identified, the change management system 110 may then use the problem change record 220 (and possibly subsequent change records 220 associated with the document 210) to revert the document 210 back to a .doc format.

The type of change to a document 210 that is important for the change management system 110 to keep track of may be different depending on the needs of the users of the change management system 110. For example, changes to document 210 permissions, security, compression, structure, content, and/or other types of changes, may be types of changes that are important to users. Thus, the change management system 110 may, responsive to an instruction from a user, configure the predefined type of change to a document 210 that is required to cause the tracked metadata field 250 of the corresponding metadata record 240 to be modified. In this way, the change management system 110 may be adapted to address particular user needs. Additionally or alternatively, the predefined type of change may be preconfigured on the change management system 110.

In addition to the time field 260a, there may be other fields in the metadata record 240 that support or enhance how the tracked metadata field 250 is tracked. For example, an additional time field 260b may be updated when the tracked metadata field 250 is initially modified. There may also be a counter 270 that is incremented each time the tracked metadata field 250 is modified, such that the counter 270 indicates the number of modifications to the tracked metadata field 250 that have occurred between the times indicated in time fields 260a-b (i.e., between the first and last time that the tracked metadata field 250 was modified). Further, there may be a user field 280 that is updated with an identification of the user responsible for the change that caused the tracked metadata field 250 to be updated. Other such fields are possible. Further, there may be one or more time fields 260a-b, counters 270, and user fields 280 for each of a plurality of tracked metadata fields 250, or for groups of tracked metadata fields 250, according to various embodiments.

An example of how the fields of a metadata record 240 corresponding to a document 210 are updated in response to changes of a predefined type is illustrated in FIG. 3. According to this example, version 1 of a document 210 is created within the storage 140. Accordingly, the change management system 110 creates a corresponding metadata record 240 in the master control file 230. In this example, each metadata record 240 in the master control file 230 comprises a tracked metadata field 250. Each metadata record 240 also comprises first and last modified time fields 260a-b, a user id field 280, and a modifications counter field 270.

Because there are yet to be any changes to document version 1, the first and last modified fields 260a-b, and the user id field 280, are initially blank. In addition, the modifications counter 270 is initialized to zero. Because the change management system 110 in this example is configured to modify the tracked metadata field 250 in response to changes to administrative privileges made to the corresponding document 210, the tracked metadata field 250 is initialized with the value A, which indicates that user Adam has administrative privileges to the document 210.

Adam subsequently modifies the document 210, resulting in document version 2. Among the changes made to the document 210 to produce version 2, Adam changes the document 210 by giving user Bob administrative privileges thereto. The change management system 110 detects that the document 210 has been changed, and generates a change record 220 that records the difference between version 1 and version 2. The change management system 110 also detects that a change to the administrative privileges of the document 210 has been made, which is a change of the predefined type that is relevant to the tracked metadata field 250. Accordingly, the change management system 110 modifies the tracked metadata field 250 by appending the value B to the previous value of A, thereby indicating that both Adam and Bob now have administrative privileges to the document 210.

Because the tracked metadata field 250 has been modified, the change management system 110 proceeds to update other of the fields in the metadata record. In this example, the change management system 110 detects that the change to the administrative privileges of document 210 version 1 is an initial change in administrative privileges, and updates the first modified time field 260b with the current time. The change management system 110 similarly updates the last modified time field 260a with the current time, since no subsequent modifications to the document 210 have yet been made. Further, because Adam was responsible for the changes to version 1 that produced version 2 of the document 210, the change management system 110 updates the user id field 280 with Adam's username. Finally, the change management system 110 increments the modification counter 270, which in this case produces the value 1 (indicating that the tracked metadata field has been modified once, regardless of the number of change records associated with the document, or the total number of document versions produced thus far).

Subsequently, Bob modifies version 2 of the document 210, resulting in document version 3. Among the changes made to the document 210 to produce version 3, Bob changes the document 210 by giving user Charlie administrative privileges thereto. The change management system 110 detects that the document 210 has again been changed, and generates a change record 220 that records the difference between version 2 and version 3. The change management system 110 also detects that a change to the administrative privileges of the document 210 has been made, and modifies the tracked metadata field 250 by appending the value C to the previous value of AB, thereby indicating that Adam, Bob, and Charlie have administrative privileges to the document 210. The last modified time field 260a is then updated to reflect the new last modified time, and the modification counter 270 is incremented. Further, Bob's user id is saved in the user id field 280. However, the first modified time field 260b remains the same as before.

Next, Charlie modifies version 3 of the document 210, resulting in document version 4. Among the changes made to the document 210 to produce version 4, Charlie attempts to correctly change the administrative privileges thereto, but mistakenly ends up ruining the document's privileges scheme in some way. Notwithstanding, as before, the change management system 110 detects that the document 210 has again been changed, and generates a change record 220 that records the difference between version 3 and version 4. The change management system 110 also detects the change to the administrative privileges of the document 210, and modifies the tracked metadata field 250 by overwriting the previous value of ABC. In this example, the change management system uses some nonsense value for the tracked metadata field 250 because of Charlie's mistake. The last modified time field 260a is updated to reflect the new last modified time, and the modification counter 270 is again incremented. Further, Charlie's user id is saved in the user id field 280. The first modified time field 260b, again, remains the same as before.

Although in this example the change management system 110 modified the tracked metadata field 250 by inserting a nonsense value, according to other embodiments, the change management system 110 may instead insert an error code that indicates a problem with the document's 210 administrative privileges. Thus, the change management system 110 may, according to embodiments, distinguish between legitimate/useful changes and erroneous/useless changes. The change management system 110 may also insert diagnostic information into the tracked metadata field 250 when a particular change introduces a problem. According to other examples, the change management system 110 may instead insert a NULL value or an empty string into the tracked metadata field 250.

It is important to note that not every change made to a document 210 tracked by the change management system 110 necessarily results in the tracked metadata field 250 being updated. Further, even if some problem exists with the document 210, this does not mean the document 210 cannot continue to be changed and used. This is illustrated in FIG. 3 by Charlie again modifying the document 210 (i.e., modifying document version 4), which results in document 210 version 5. However, this time Charlie does not make any changes to the administrative privileges of the document 210. Thus, once again, the change management system 110 detects that the document 210 has been changed and generates a change record 220 that records the differences from the previous version. However, because no change to administrative privileges was made, the tracked metadata field 250 is not modified. Further, since the tracked metadata field 250 is not modified, neither are the first and last modified time fields 260a-b, the user id field 280, or the modification counter 270.

Because the change management system 110 has a change record 220 for each instance in which a new version of the document 210 was introduced, the change records 220 may be used to revert the document 210 back to a previous state. In this particular example, the change records 220 may be used to revert the document 210 back to the version before Charlie's botched attempt at changing the administrative privileges of the document 210 (i.e., may be reverted to version 3). According to embodiments, such as that shown in FIG. 3, the metadata record 240 corresponding to the document 210 may similarly be reverted to a previous state, in order to maintain consistency with the document 210.

Figure 4:
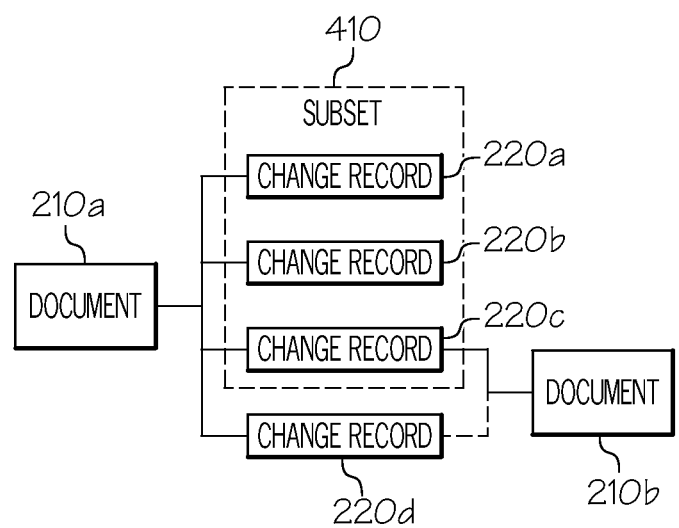
FIG. 4 is a block diagram illustrating an example of a document being reverted to a previous state according to one or more embodiments of the present disclosure.

Reverting the document 210 of FIG. 3 to a previous state may be performed, for example, as illustrated in FIG. 4. In the example of FIG. 4, the fifth version of the document 210a is reverted to the third version of the document 210b using at least one change record 220. In this example, change records 220a, 220b, 220c, 220d are the change records 220 generated in response to the document 210 being updated to versions 2, 3, 4, and 5, respectively, as previously discussed with reference to FIG. 3.

However, as previously discussed, not all of the change records 220a-d relate to changes to administrative privileges of the document 210. In particular, the change record 220d (produced when the document 210 was changed from version 4 to version 5) is not relevant to any change in administrative privileges. Because that change record 220d is not relevant to any change in administrative privileges, it may be excluded from consideration when attempting to locate the problem change record 220c (i.e., when attempting to locate the change record 220c that captures the change that introduced the problem, which in this example occurred when the document 220 was changed from version 3 to version 4). To at least exclude change record 220d, the change management system 110 generates a subset 410 of the change records 220 based on the time field 260a in the metadata record 240 that corresponds to the document 210a.

In particular, the metadata record 240 for document 210a (i.e., document version 5) indicates in time field 260a a last modified time of Jan. 5, 2016 at 9:00 am. Change record 220c is the last change record 220 to have been generated at that time or earlier. The metadata record 240 for document 210a also indicates in time field 260b a first modified time of Jan. 1, 2016 at 5:00 am. Change record 220a is the first change record to have been generated at that time or later. Thus, the time fields 260a-b establish a time window in which modifications to the tracked metadata field 250 have occurred. The change management system 110 may thus use this time window to select change records 220 relevant to modifications of the tracked metadata field 250. For example, in this example, change records 220a-c are within the time window established by the time fields 260a-b in the metadata record of document 210a, and are therefore selected to be in the subset 410, whereas change record 220d is not selected to be in the subset. Further, consistent with the modifications counter 270 (which indicates three modifications), three change records 220a-c are selected to be in the subset 410.

Of course, the example of FIGS. 3 and 4 is a very simple example in which selection of the subset 410 excludes only a single change record 220d. However, a change management system 110 may be tracking massive numbers of other documents 210, and there may be myriad changes to those documents 210 that are unrelated to the predefined type of change that would cause the tracked metadata fields 250 associated therewith to be updated. Thus, according to various embodiments, the selection of subset 410 may be include selection of a very small number of change records 220 as compared to the total number of change records 220 in storage 120 by excluding numerous change records 220 that were generated either before or after the time window and which are not relevant to modifications of the tracked metadata field 250. Such a dramatic reduction in the number of change records 220 requiring consideration may be of significant assistance toward identifying the problem change record (which in this example is change record 220c).

The change management system 110 identifies the problem change record 220c from the change records 220a-c in the subset 410. In one embodiment, the change management system 110 identifies the problem change record 220c by reporting the subset 410 to a user (e.g., a user of client device 140), and receives identification of the problem change record 220c from that user in response. In another embodiment, the change management system 110 identifies change record 220c as the last change record 220 in the subset 410, and therefore presumes that change record 220c records the change that introduced the problem with the document 210a. In another embodiment, change management system 110 may revert the document 210a iteratively through previous versions using change records 220 in the subset 410 until a target value for the tracked metadata field 250 is restored to the metadata record 240. Other schemes for identifying the problem change record 220c are possible, according to other embodiments.

Once the problem change record 220c is identified, the problem change record 220c is used to revert the document 210a to a state previous to the problem event. Change record 220d, having been generated subsequent to problem change record 220c, may also be used. For example, change record 220d may be used to revert document 210a to an intermediate document version (e.g., version 4, not shown), and then problem change record 220c may be applied to revert the intermediate document version to the third version of the document 210b. As discussed above, the third version of the document 210b existed before Charlie introduced the administrative privileges problem.

Having reverted document 210a to document 210b, the change management system 110 may also restore the metadata record 240 to a previous state (e.g., such that each field in the metadata record 240 is the same as indicated for version 3 in FIG. 3). In addition, the process of restoring the metadata record 240 to the previous state may be used to identify that Charlie was responsible for the change that caused the administrative privileges problem. For example, as shown in FIG. 3, the state of the metadata record 240 corresponding to document revision 4 shows that Charlie was the user responsible for the change that caused the valid value of ABC in the tracked metadata field 250 to change to a nonsense value. Thus, the metadata record 240 helps to establish an audit trail for the tracked metadata field 250 and/or the corresponding document 210, according to embodiments.

Figure 5:
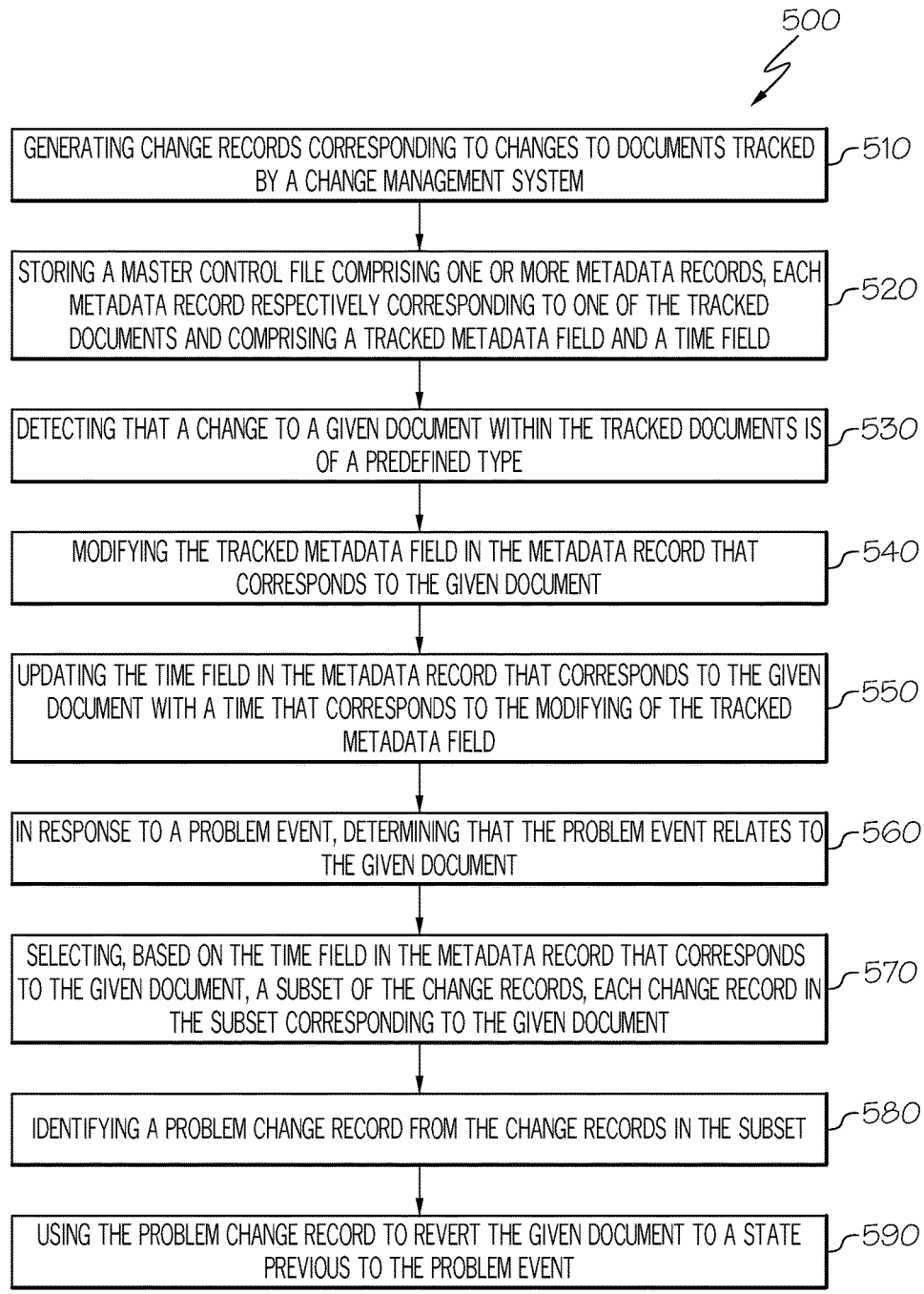
FIG. 5 is a flow diagram illustrating an example method for enhanced metadata tracking in a change management system according to one or more embodiments of the present disclosure.

From the discussion above, it is apparent that embodiments of the present disclosure exist according to a variety of methods. An example of such a method 500, as implemented in a computing device (e.g., a computing device that is wholly, or a part of, a change management system 110), is illustrated in FIG. 5. The method 500 comprises generating change records 220 corresponding to changes to documents 210 tracked by a change management system 110 (block 510), and storing a master control file 230 comprising one or more metadata records 240 (block 520). Each metadata record 240 respectively corresponds to one of the tracked documents 210 and comprises a tracked metadata field 250 and a time field 260. The method 500 further comprises, responsive to detecting that a change to a given document within the tracked documents 210 is of a predefined type (block 530), modifying the tracked metadata field 250 in the metadata record 240 that corresponds to the given document (block 540), and updating the time field 260 in the metadata record 240 that corresponds to the given document with a time that corresponds to the modifying of the tracked metadata field 250 (block 550). The method 500 further comprises, in response to a problem event, determining that the problem event relates to the given document (block 560), and selecting, based on the time field 260 in the metadata record 240 that corresponds to the given document, a subset 410 of the change records 220, each change record 220 in the subset 410 corresponding to the given document (block 570). The method further comprises, in response to the problem event, identifying a problem change record from the change records 220 in the subset 410 (block 580), and using the problem change record to revert the given document to a state previous to the problem event (block 590).

Figure 6:
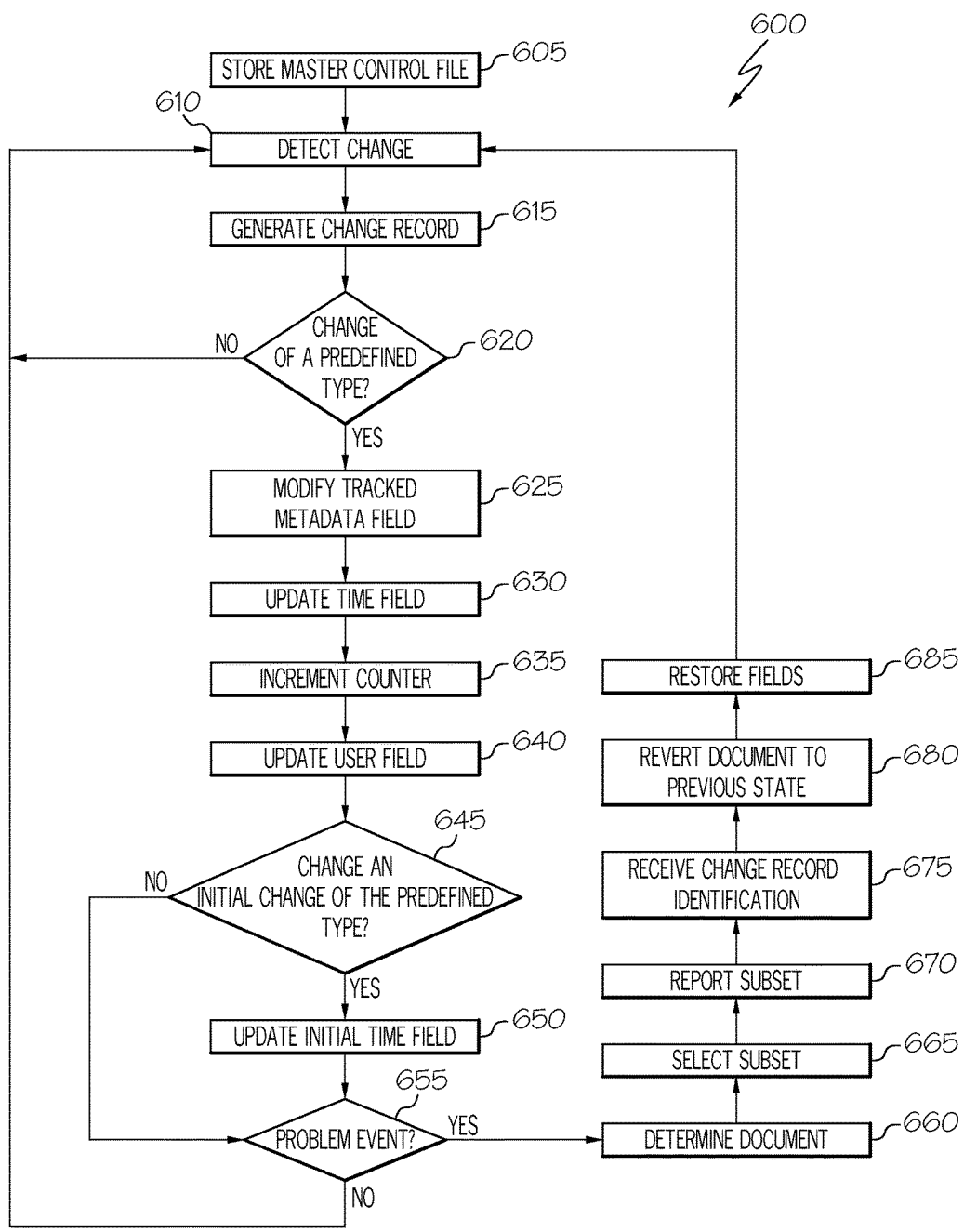
FIG. 6 is a flow diagram illustrating a more detailed example method for enhanced metadata tracking in a change management system according to one or more embodiments of the present disclosure.

A more detailed example of a method 600, implemented in a computing device, is illustrated in FIG. 6. The method 600 comprises storing a master control file 230 comprising one or more metadata records 240, each metadata record 240 respectively corresponding to one of the tracked documents 210 and comprising a tracked metadata field 250, a modification counter 270, a user field 280, a time field 260a, and an initial time field 260b, as previously discussed (block 605).

The method 600 further comprises detecting a change to a document 210 (block 610), and generating a change record 220 corresponding to the change (block 615). If the change is not of a predefined type (block 620), then the method 600 continues to detect some further change (block 610), as previously discussed. If the change is of a predefined type (block 620), the method 600 comprises modifying the tracked metadata field 250 in the metadata record 240 that corresponds to the document 210 (block 625), updating the time field 260a with a time that corresponds to the modifying of the tracked metadata field 250 (block 630), incrementing the modification counter 270 (block 635), and updating the user field 280 with an identification of the user responsible for the change (block 640). The method 600 further comprises, in response to the change being an initial change of the predefined type (block 645), updating the initial time field 260b with the time corresponding to the modifying of the tracked metadata field 250 (block 650). If the change is not an initial change of the predefined type (block 645), the initial time field is not updated.

If a problem event is not detected (block 655), the method 600 returns to detecting some further change (block 610), as previously discussed. However, if a problem event is detected (block 655), the method 600 comprises determining that the problem event relates to the document (block 660), and selecting, based on a time window established by the value of time field 260a and initial time field 260b, a subset 410 of the change records 220 (block 665). In particular, each change record 220 in the subset corresponds to the changed document 210. The method 600 further comprises reporting the subset 410 to a user (block 670) and receiving, from that user, identification of a problem change record from the change records 220 in the subset 410 in response (block 675). The method 600 further comprises using the identified problem change record to revert the document to a state previous to the problem event (block 680), and restoring the tracked metadata field 250 and time fields 260a-b to values associated with the state previous to the problem event (block 685). The method 600 then returns to detecting further changes to documents (block 610), as previously described.

Figure 7:
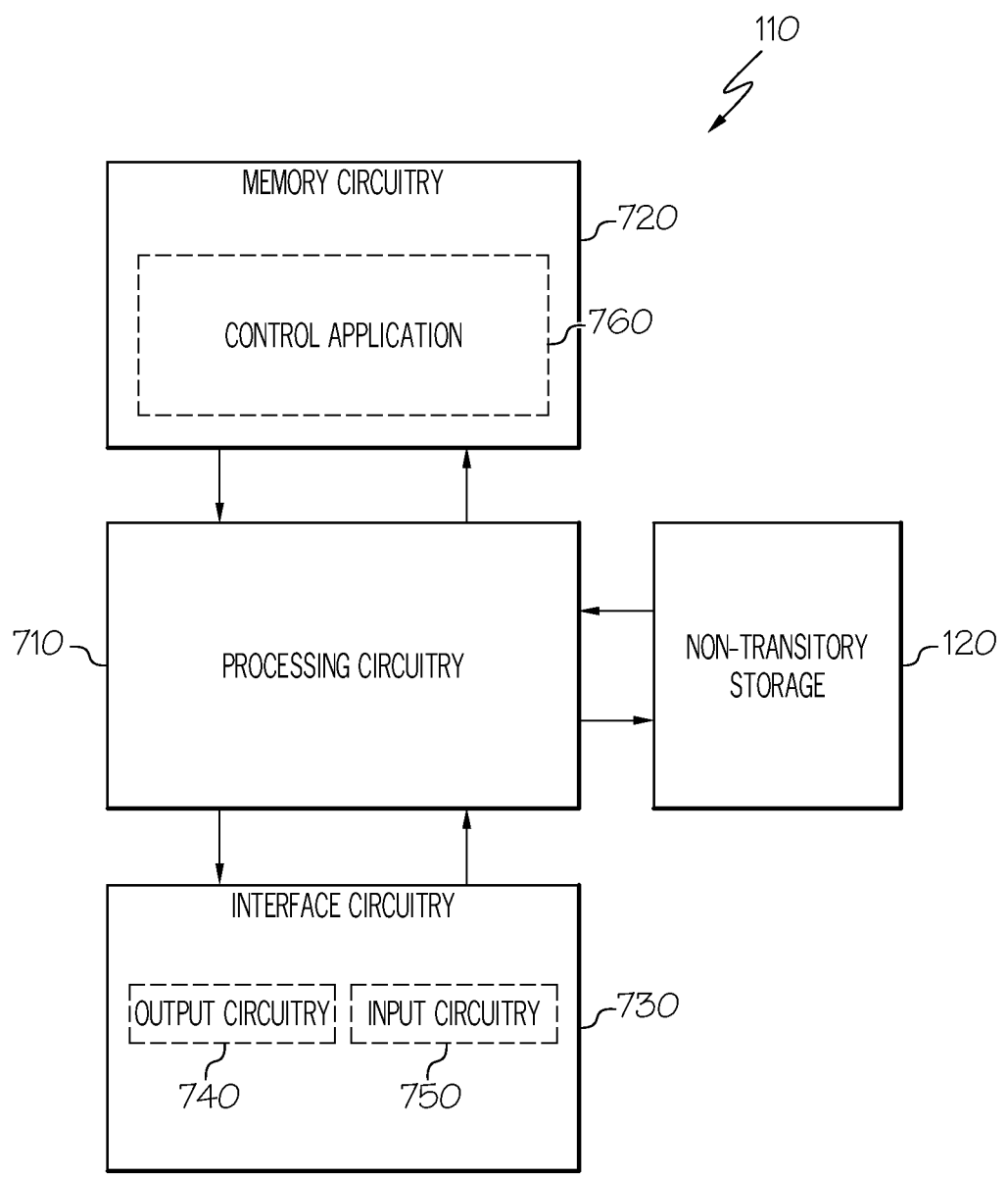
FIG. 7 is a block diagram illustrating exemplary hardware configured according to one or more embodiments of the present disclosure.

The computing device may be implemented according to the example hardware illustrated in FIG. 7, for example, as part (or the entirety) of change management system 110. The example hardware of FIG. 7 comprises processing circuitry 710, memory circuitry 720, non-transitory storage 120, and interface circuitry 730. The processing circuitry 710 is communicatively coupled to the non-transitory storage 120, memory circuitry 720 and interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing machine instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The non-transitory storage 120 may be any number of combination of physical storage devices, including (but not limited to) a fixed drive, a solid state drive, a redundant array of independent disks (RAID), a SAN, and a removable storage device. The non-transitory storage 120 may be configured to store data, such as described above.

The interface circuitry 730 may be a controller hub configured to control the input and output (I/O) data paths of the computing device 110. Such I/O data paths may include data paths for exchanging signals over a communications network 130 and/or data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touch-screen, microphone for speech input, optical sensor for optical recognition of gestures, and keyboard for text entry.

The interface circuitry 730 may also comprise input circuitry 750 and output circuitry 740. For example, the output circuitry 740 may comprise a transmitter configured to send communication signals over the communications network 130, whereas the input circuitry 750 may comprise a receiver configured to receive communication signals over the communications network 130. Thus, the interface circuitry 730 may be implemented as a unitary physical component, or as a plurality of physical components that may be contiguously or separately arranged, any of which may be communicatively coupled to any other, or may communicate with any other via the processing circuitry 710. Similarly, the output circuitry 740 may comprise a display, whereas the input circuitry 750 may comprise a keyboard. Other examples, permutations, and arrangements of the above and their equivalents will be readily apparent to those of ordinary skill.

The processing circuitry 710 may be configured to generate change records 220 corresponding to changes to documents 210 tracked by the change management system 110, and store, in the non-transitory storage 120, a master control file 230 comprising one or more metadata records 240. Each metadata record 240 respectively corresponds to one of the tracked documents 210 and comprises a tracked metadata field 250 and a time field 260. Responsive to detecting that a change to a given document within the tracked documents 210 is of a predefined type, the processing circuitry 710 may be further configured to modify the tracked metadata field 250 in the metadata record 240 that corresponds to the given document, and update the time field 260 in the metadata record 240 that corresponds to the given document with a time that corresponds to the modifying of the tracked metadata field 250. In response to a problem event, the processing circuitry may be further configured to determine that the problem event relates to the given document, and select, based on the time field 260 in the metadata record 240 that corresponds to the given document, a subset 410 of the change records 220. Each change record 220 in the subset 410 corresponds to the given document. In response to a problem event, the processing circuitry may be further configured to identify a problem change record from the change records 220 in the subset 410, and use the problem change record to revert the given document to a state previous to the problem event.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method, comprising:
   generating change records corresponding to changes to documents tracked by a change management system;
   tracking a subset of metadata fields for the tracked documents, wherein each tracked metadata field includes information about the corresponding tracked document other than time and version information related to changes to the tracked document;
   storing a master control file comprising one or more metadata records, each metadata record respectively corresponding to one of the tracked documents and comprising a respective tracked metadata field and a time field;
   responsive to detecting that a change to metadata for a given document within the tracked documents is of a predefined type, wherein the predefined type of change includes a change to a tracked metadata field corresponding to the given document:
      modifying, based on the change, the tracked metadata field in the metadata record that corresponds to the given document;
      updating the time field in the metadata record that corresponds to the given document with a time that corresponds to the modifying of the tracked metadata field; and
   in response to a problem event:
      determining that the problem event relates to the given document;
      selecting, based on the time field in the metadata record that corresponds to the given document, a subset of the change records, each change record in the subset corresponding to the given document;
      identifying a problem change record from the change records in the subset; and
      using the problem change record to revert the given document to a state previous to the problem event.

2. The method of claim 1, further comprising, in response to the problem event, restoring the tracked metadata field and time field in the metadata record that corresponds to the given document to values associated with the state previous to the problem event.

3. The method of claim 1, further comprising:
   reporting the subset to a user;
   wherein identifying the problem change record from the change records in the subset comprises receiving identification of the problem change record from the user.

4. The method of claim 1, wherein:
   each metadata record further includes a corresponding initial time field that, together with the corresponding time field, establish a time window in which one or more modifications to the tracked metadata field have occurred; and
   selecting the subset of the change records is further based on the time window.

5. The method of claim 4, further comprising responsive to detecting that the change to the given document is an initial change of the predefined type made to the given document, also updating the initial time field in the metadata record that corresponds to the given document with the time that corresponds to the modifying of the tracked metadata field.

6. The method of claim 4:
   wherein each metadata record further comprises a counter indicating a number of modifications to the tracked metadata field that have occurred within the time window;
   further comprising, responsive to the detecting that the change to the given document is of the predefined type, incrementing the counter in the metadata record that corresponds to the given document;
   wherein selecting the subset of the change records comprises selecting at least as many change records as is indicated by the counter in the metadata record that corresponds to the given document.

7. The method of claim 1:
   wherein each metadata record further comprises a user field;
   further comprising, responsive to the detecting that the change to the given document is of a predefined type, updating the user field with an identification of a user responsible for the change.

8. The method of claim 1, wherein reverting the given document to the state previous to the problem event further comprises using a further change record, the further change record having been generated subsequent to the problem change record.

9. The method of claim 1, further comprising configuring the predefined type of change responsive to an instruction from a user.

10. A change management system comprising:
    non-transitory storage configured to store data;
    processing circuitry communicatively coupled to the non-transitory storage and configured to:
       generate change records corresponding to changes to documents tracked by a change management system;
       track a subset of metadata fields for the tracked documents, each tracked metadata field including information about the corresponding tracked document other than time and version information related to changes to the tracked document;
       store, in the non-transitory storage, a master control file comprising one or more metadata records, each metadata record respectively corresponding to one of the tracked documents and comprising a respective tracked metadata field and a time field;
       responsive to detecting that a change to metadata for a given document within the tracked documents is of a predefined type, wherein the predefined type of change includes a change to a tracked metadata field corresponding to the given document:
          modify, based on the change, the tracked metadata field in the metadata record that corresponds to the given document;

update the time field in the metadata record that corresponds to the given document with a time that corresponds to the modifying of the tracked metadata field; and in response to a problem event:
determine that the problem event relates to the given document;
select, based on the time field in the metadata record that corresponds to the given document, a subset of the change records, each change record in the subset corresponding to the given document;
identify a problem change record from the change records in the subset; and
use the problem change record to revert the given document to a state previous to the problem event.

11. The change management system of claim 10, wherein the processing circuitry is further configured to, in response to the problem event, restore the tracked metadata field and time field in the metadata record that corresponds to the given document to values associated with the state previous to the problem event.

12. The change management system of claim 10, wherein:
the processing circuitry is further configured to report the subset to a user; and
to identify the problem change record from the change records in the subset, the processing circuitry is configured to receive identification of the problem change record from the user.

13. The change management system of claim 10, wherein:
each metadata record further includes a corresponding initial time field that, together with the corresponding time field, establish a time window in which one or more modifications to the tracked metadata field have occurred; and
the processing circuitry is configured to select the subset of the change records further based on the time window.

14. The change management system of claim 13, wherein the processing circuitry is further configured to, responsive to detecting that the change to the given document is an initial change of the predefined type made to the given document, also update the initial time field in the metadata record that corresponds to the given document with the time that corresponds to the modifying of the tracked metadata field.

15. The change management system of claim 13, wherein:
each metadata record further comprises a counter indicating a number of modifications to the tracked metadata field that have occurred within the time window;
the processing circuitry is further configured to, responsive to the detecting that the change to the given document is of the predefined type, increment the counter in the metadata record that corresponds to the given document; and
to select the subset of the change records, the processing circuitry is configured to select at least as many change records as is indicated by the counter in the metadata record that corresponds to the given document.

16. The change management system of claim 10, wherein:
each metadata record further comprises a user field; and
the processing circuitry is further configured to, responsive to the detecting that the change to the given document is of a predefined type, update the user field with an identification of a user responsible for the change.

17. The change management system of claim 10, wherein to revert the given document to the state previous to the problem event, the processing circuitry is further configured to use a further change record, the further change record having been generated subsequent to the problem change record.

18. The change management system of claim 10, wherein the processing circuitry is further configured to configure the predefined type of change responsive to an instruction from a user.

19. A non-transitory computer readable medium storing software instructions that, when executed by processing circuitry of a programmable change management system, cause the programmable change management system to:
generate change records corresponding to changes to documents tracked by a change management system;
track a subset of metadata fields for the tracked documents, each tracked metadata field including information about the corresponding tracked document other than time and version information related to changes to the tracked document;
store a master control file comprising one or more metadata records, each metadata record respectively corresponding to one of the tracked documents and comprising a respective tracked metadata field and a time field;
responsive to detecting that a change to metadata for a given document within the tracked documents is of a predefined type, wherein the predefined type of change includes a change to a tracked metadata field corresponding to the given document:
modify, based on the change, the tracked metadata field in the metadata record that corresponds to the given document;
update the time field in the metadata record that corresponds to the given document with a time that corresponds to the modifying of the tracked metadata field; and in response to a problem event:
determine that the problem event relates to the given document;
select, based on the time field in the metadata record that corresponds to the given document, a subset of the change records, each change record in the subset corresponding to the given document;
identify a problem change record from the change records in the subset; and
use the problem change record to revert the given document to a state previous to the problem event.

20. The non-transitory computer readable medium of claim 19, wherein:
each metadata record further includes a corresponding initial time field that, together with the corresponding time field, establish a time window in which one or more modifications to the tracked metadata field have occurred;
the software instructions, when executed by the processing circuitry of the programmable change management system, further cause the programmable change management system to, responsive to detecting that the change to the given document is an initial change of the predefined type made to the given document, also update the initial time field in the metadata record that corresponds to the given document with the time that corresponds to the modifying of the tracked metadata field; and
the software instructions, when executed by the processing circuitry of the programmable change management system, cause the programmable change management system to select the subset of the change records further based on the time window.

* * * * *